(12) United States Patent
Yao et al.

(10) Patent No.: US 7,255,456 B2
(45) Date of Patent: Aug. 14, 2007

(54) DIRECT BACKLIGHT MODULE

(75) Inventors: Po-Hung Yao, Luzhu Shiang (TW); Yu-Nan Pao, Zhubei (TW); Hsiu-Chen Hsu, Tainan (TW); Yi-Ting Sun, Taipei (TW); Ben-Sheng Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/245,260

(22) Filed: Oct. 7, 2005

(65) Prior Publication Data

US 2007/0035940 A1 Feb. 15, 2007

(30) Foreign Application Priority Data

Aug. 10, 2005 (TW) .............................. 94127217 A

(51) Int. Cl.
*F21S 4/00* (2006.01)
(52) U.S. Cl. ...................... 362/225; 362/330; 362/607
(58) Field of Classification Search .................. 362/29, 362/30, 225, 607, 633, 330, 331, 339, 246, 362/561; 349/64, 65
See application file for complete search history.

(56) References Cited

U.S. PATENT DOCUMENTS

| | | | |
|---|---|---|---|
| 4,053,208 A * | 10/1977 | Kato et al. .................. 359/460 |
| 4,488,208 A * | 12/1984 | Miller ........................ 362/339 |
| 4,791,540 A | 12/1988 | Dreyer, Jr. et al. ......... 362/331 |
| 5,128,783 A * | 7/1992 | Abileah et al. ............. 349/162 |
| 5,280,371 A | 1/1994 | McCartney, Jr. et al. ..... 359/40 |
| 5,748,828 A * | 5/1998 | Steiner et al. .............. 385/146 |
| 5,883,607 A * | 3/1999 | Williams ..................... 345/32 |
| 6,091,547 A | 7/2000 | Gardiner et al. ............ 359/625 |
| 6,606,133 B1 * | 8/2003 | Okabe ......................... 349/65 |
| 6,611,303 B1 * | 8/2003 | Lee et al. ..................... 349/65 |
| D493,566 S * | 7/2004 | Yu et al. .................... D26/122 |
| 6,791,693 B2 * | 9/2004 | Hill ............................. 356/500 |
| 6,897,911 B2 * | 5/2005 | Yamaguchi .................. 349/57 |
| 2005/0002204 A1 * | 1/2005 | Lin et al. .................... 362/551 |

FOREIGN PATENT DOCUMENTS

TW M266466 6/2005

* cited by examiner

*Primary Examiner*—Sandra O'Shea
*Assistant Examiner*—Zahra I. Bennett
(74) *Attorney, Agent, or Firm*—Troxell Law Office, PLLC

(57) ABSTRACT

A direct backlight module is disclosed, which comprises: a frame; at least a light source, being arranged in the frame; a diffuser, being disposed over the frame; and at least an optical film, being disposed over the diffuser, comprising a substrate having a top surface and a bottom surface; wherein a diffusion unit and a collimation unit are formed on the top surface while using the diffusion unit for diffusing light incident to the bottom surface and the collimation unit for collimating light incident to the bottom surface. The direct backlight module of the invention is capable of enhancing luminous efficiency, and further, it has a comparatively simple structure so that the manufacturing cost of the optical film can be reduced.

28 Claims, 17 Drawing Sheets

DIRECT BACKLIGHT MODULE

FIELD OF THE INVENTION

The present invention relates to a direct backlight module, and more particularly, to an backlight module having an optical film of diffusion and collimation abilities disposed therein

BACKGROUND OF THE INVENTION

Nowadays, it is commonly seen that backlight modules are used for electronic devices with flat panel displays, which includes devices as small as hand-held palm pilots and as large as big-screen TVs. A typical backlight consists of a light source, such as Cold Cathode Fluorescent (CCFL) or Light Emitting Diodes (LED), a light guide, a diffuser, and a brightness enhancement film. The design challenge of a backlight module is to generate uniform illumination across the LCD surface and luminance that is high enough to produce good contrast in a day environment (so that you can see the display of a laptop computer or a handheld electronic device, for example, with the room lights on), by the cooperation of the diffuser and the brightness enhancement film. Moreover, a conventional backlight usually consists of a plurality of optical films, which is the cause of low luminous efficacy, high manufacture cost and low assembly yield, and so on.

Please refer to FIG. 1, which is a perspective view of a luminance control film disclosed in U.S. Pat. No. 4,791,540, entitled "LIGHT FIXTURE PROVIDING NORMALIZED OUTPUT". The luminance control film of FIG. 1 comprises a light source 10 and two lenticular sheets 12 and 14, being respectively disposed over the light source 10 for receiving light discharging therefrom; wherein the two lenticular sheets 12 and 14 is capable of collimating light incident thereto so as to enhance the direct luminance of the light fixture. However, the disclosed luminance control film is capable of collimating light effectively using the two lenticular sheets 12 and 14, it is disadvantageous by being able to diffuse incident light sufficiently enough to produce uniform illumination. Therefore, at least an additional diffuser is needed in the luminance control film of FIG. 1 for enabling the light fixture to produce uniform illumination. Thus, it is desired to have an optical film with both collimating and diffusion abilities without requiring the additional diffuser.

Please refer to FIG. 2, which is a typical assembly of the backlight module disclosed in U.S. Pat. No. 5,280,371, entitled "DIRECTIONAL DIFFUSER FOR A LIQUID CRYSTAL DISPLAY". The assembly of FIG. 2 comprises a backlight array 20 with a plurality of lamps; a diffuser 22; a cylindrical lens array 24; and a liquid crystal panel 26; wherein, as the light discharging from the backlight array 20 impinges on the diffuser 22, it is scattered and thus blurring the image of the lamps; and thereafter, the scattered light is enhanced by the cylindrical lens array 24 so as to enable the light energy to concentrate on the liquid crystal panel 26. The cylindrical lens array has its pros and cons with respect to obtain the required concentration of luminance and variation of luminance with viewing angles, which is also true of the triangle lens array. Therefore, it is desired to have an optical film having cylindrical array and prism array formed thereon, which not only can simplified the structure complexity of the backlight module, but also can obtain a preferred optical effect by the combination of the two lens arrays.

Therefore, it is in great demand to have a direct backlight module having an optical film with micro-structures of diffusion and collimation abilities formed thereon, that it is capable of enhancing luminous efficiency, and further, it has a comparatively simple structure so as to reduce the manufacturing cost thereof.

SUMMARY OF THE INVENTION

In view of the disadvantages of prior art, the primary object of the present invention is to provide a direct backlight module, having an optical film with micro-structures of diffusion and collimation abilities, which is capable of obtaining the required concentration of luminance and variation of luminance with viewing angles, and enabling the backlight module to have a comparatively simple structure so as to reduce the manufacturing cost thereof.

It is another object of the invention to provide a direct backlight module, adopting a diffuser with micro-structures of diffusion and collimation abilities instead of using a diffuser and a light enhancement film, by which is capable of obtaining the required concentration of luminance and variation of luminance with viewing angles, and enabling the backlight module to have a comparatively simple structure so as to reduce the manufacturing cost thereof.

To achieve the above objects, the present invention provides a direct backlight module, which comprises: a frame; at least a light source, being arranged in the frame; a diffuser, being disposed over the frame; and at least an optical film, being disposed over the diffuser, further comprising a substrate having a top surface and a bottom surface; wherein a diffusion unit and a collimation unit are formed on the top surface while using the diffusion unit for scattering light incident to the bottom surface and the collimation unit for collimating light incident to the bottom surface.

In a preferred aspect of the invention, the diffusion unit further comprises at least a semi-lenticular lens, each being disposed parallel to a first direction while the axis thereof being defined by a first function of straight line or curve line, and each characterized by a specific radius of curvature preferably in the range of 10 microns to 500 microns, and the collimation unit further comprises at least a prism, each being disposed parallel to a second direction while the axis thereof being defined by a second function of straight line or curve line, and each characterized by a vertex angle preferably in the range of 30° to 140° and a specific height, whereas the included angle formed between the first direction and the second direction is in the range of 0° to 90°.

In a preferred aspect of the invention, at least a light modulation element is formed on the top surface of the substrate of the optical film while each light modulation element is composed by superimposing a prism on top of a semi-lenticular lens, whereas the semi-lenticular lens is characterized by a specific radius of curvature preferably in the range of 10 microns to 500 microns and the prism is characterized by a vertex angle preferably in the range of 30° to 140° and a specific height.

In a preferred aspect of the invention, at least a light modulation element and at least a first semi-lenticular lens are formed on the top surface of the substrate of the optical film while each light modulation element is composed by superimposing a prism on top of a second semi-lenticular lens, whereas the first and the second semi-lenticular lenses respectively is characterized by a specific radius of curvature preferably in the range of 10 microns to 500 microns and the prism is characterized by a vertex angle preferably in the range of 30° to 140° and a specific height.

In a preferred aspect of the invention, at least a light modulation element and at least a first prism are formed on the top surface of the substrate of the optical film while each light modulation element is composed by superimposing a second prism on top of a semi-lenticular lens, whereas the semi-lenticular lens is characterized by a specific radius of curvature preferably in the range of 10 microns to 500 microns and the first and the second prisms respectively is characterized by a vertex angle preferably in the range of 30° to 140° and a specific height.

In a preferred aspect of the invention, at least a light modulation element, at least a first semi-lenticular lens and at least a first prism are formed on the top surface of the substrate of the optical film while each light modulation element is composed by superimposing a second prism on top of a second semi-lenticular lens, whereas the first and the second semi-lenticular lenses respectively is characterized by a specific radius of curvature preferably in the range of 10 microns to 500 microns and the first and the second prisms respectively is characterized by a vertex angle preferably in the range of 30° to 140° and a specific height.

Moreover, it is noted that the specific radiuses of curvature of different semi-lenticular lenses can be different, and the vertex angles of different prism can be different, and the specific heights of different prisms can be different. In addition, the specific height of each prism can be varying along the axis of the same, and similarly the specific radius of curvature of each semi-lenticular lens can also be varying along the axis of the same.

Preferably, a plurality of microstructures with light collimation and diffusion capabilities are formed on the top surface of the substrate of the optical film.

Yet, preferably, the direct backlight module of the invention can comprises two optical films, wherein the orientation of one of the two optical films is rotated by an angle range between 0° and 90° to be placed overlapping another optical film.

In addition, to achieve the above objects, the present invention provides another direct backlight module, which comprises: a frame; at least a light source, being arranged in the frame; and a diffuser having a top surface and a bottom surface, being disposed over the frame and doped with micro particles for light scattering; wherein a diffusion unit and a collimation unit are formed on the top surface of the diffuser while using the diffusion unit for scattering light incident to the bottom surface and the collimation unit for collimating light incident to the bottom surface.

Preferably, the thickness of the diffuser is in the range between 1 mm to 3 mm.

In a preferred aspect of the invention, the diffusion unit further comprises at least a semi-lenticular lens, each being disposed parallel to a first direction while the axis thereof being defined by a first function of straight line or curve line, and each characterized by a specific radius of curvature preferably in the range of 10 microns to 500 microns, and the collimation unit further comprises at least a prism, each being disposed parallel to a second direction while the axis thereof being defined by a second function of straight line or curve line, and each characterized by a vertex angle preferably in the range of 30° to 140° and a specific height, whereas the included angle formed between the first direction and the second direction is in the range of 0° to 90°.

In a preferred aspect of the invention, at least a light modulation element is formed on the top surface of the diffuser while each light modulation element is composed by superimposing a prism on top of a semi-lenticular lens, whereas the semi-lenticular lens is characterized by a specific radius of curvature preferably in the range of 10 microns to 500 microns and the prism is characterized by a vertex angle preferably in the range of 30° to 140° and a specific height.

In a preferred aspect of the invention, at least a light modulation element and at least a first semi-lenticular lens are formed on the top surface of the diffuser while each light modulation element is composed by superimposing a prism on top of a second semi-lenticular lens, whereas the first and the second semi-lenticular lenses respectively is characterized by a specific radius of curvature preferably in the range of 10 microns to 500 microns and the prism is characterized by a vertex angle preferably in the range of 30° to 140° and a specific height.

In a preferred aspect of the invention, at least a light modulation element and at least a first prism are formed on the top surface of the diffuser while each light modulation element is composed by superimposing a second prism on top of a semi-lenticular lens, whereas the semi-lenticular lens is characterized by a specific radius of curvature preferably in the range of 10 microns to 500 microns and the first and the second prisms respectively is characterized by a vertex angle preferably in the range of 30° to 140° and a specific height.

In a preferred aspect of the invention, at least a light modulation element, at least a first semi-lenticular lens and at least a first prism are formed on the top surface of the diffuser while each light modulation element is composed by superimposing a second prism on top of a second semi-lenticular lens, whereas the first and the second semi-lenticular lenses respectively is characterized by a specific radius of curvature preferably in the range of 10 microns to 500 microns and the first and the second prisms respectively is characterized by a vertex angle preferably in the range of 30° to 140° and a specific height.

Moreover, it is noted that the specific radiuses of curvature of different semi-lenticular lenses can be different, and the vertex angles of different prism can be different, and the specific heights of different prisms can be different. In addition, the specific height of each prism can be varying along the axis of the same, and similarly the specific radius of curvature of each semi-lenticular lens can also be varying along the axis of the same.

Preferably, a plurality of microstructures with light collimation and diffusion capabilities are formed on the top surface of the diffuser.

To sum up, the present invention is to provide a direct backlight module, having an optical film or diffuser with micro-structures of diffusion and collimation abilities, which is capable of obtaining the required concentration of luminance and variation of luminance with viewing angles, and enabling the backlight module to have a comparatively simple structure so as to reduce the manufacturing cost thereof.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
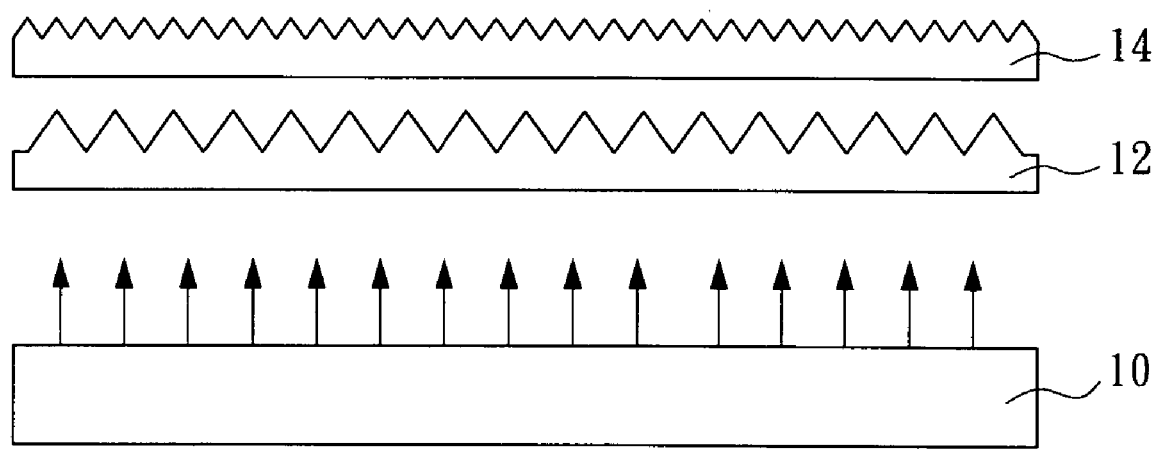
FIG. 1 is a perspective view of a luminance control film disclosed in U.S. Pat. No. 4,791,540.
Figure 2:
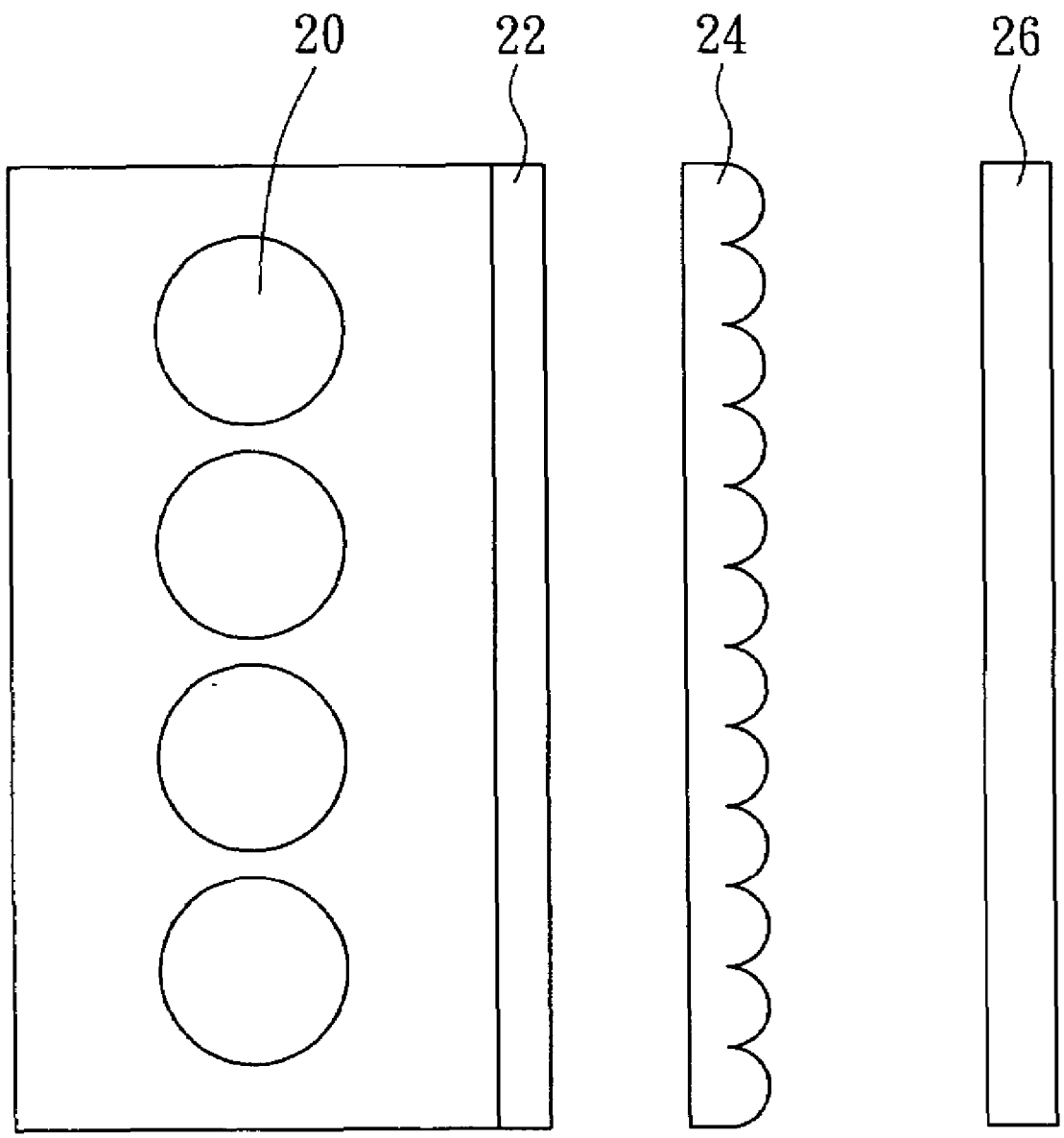
FIG. 2 is an assembly of the backlight module disclosed in U.S. Pat. No. 5,280,371.
Figure 3A:
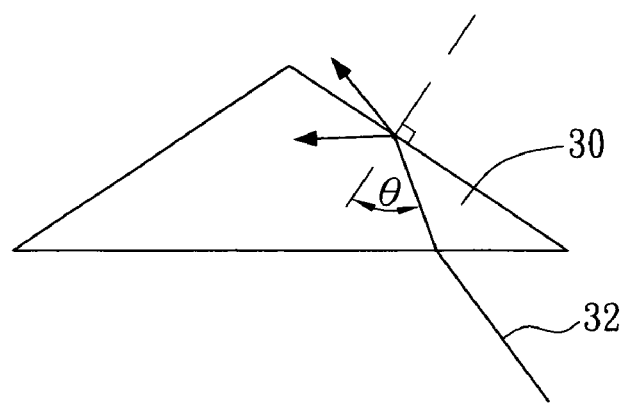
FIG. 3A is a schematic diagram depicting the optical characteristics of a prism.

According to Snell's Law, it is noted that a prism can be used to collimate light effectively as seen in FIG. 3A, that is, it can reduce the divergent angle of an incident light. In FIG. 3A, when an incident light 32 traveling in the prism 30 is traveling across an interface from the prism 30 to the external environment by an angle of $\theta$, i.e. from a media with higher refractive index to another media with lower refractive index, at the condition that the incident angle $\theta$ is larger than the critical angle of total internal reflection, then the light is totally reflected off the interface following the dotted arrow of FIG. 3A, on the other hand, when the incident angle $\theta$ is smaller than the critical angle of total internal reflection, the exiting light, shown as the solid arrow of FIG. 3A, will bend away from the normal of the interface (i.e. the dotted line of FIG. 3A).

Figure 3B:
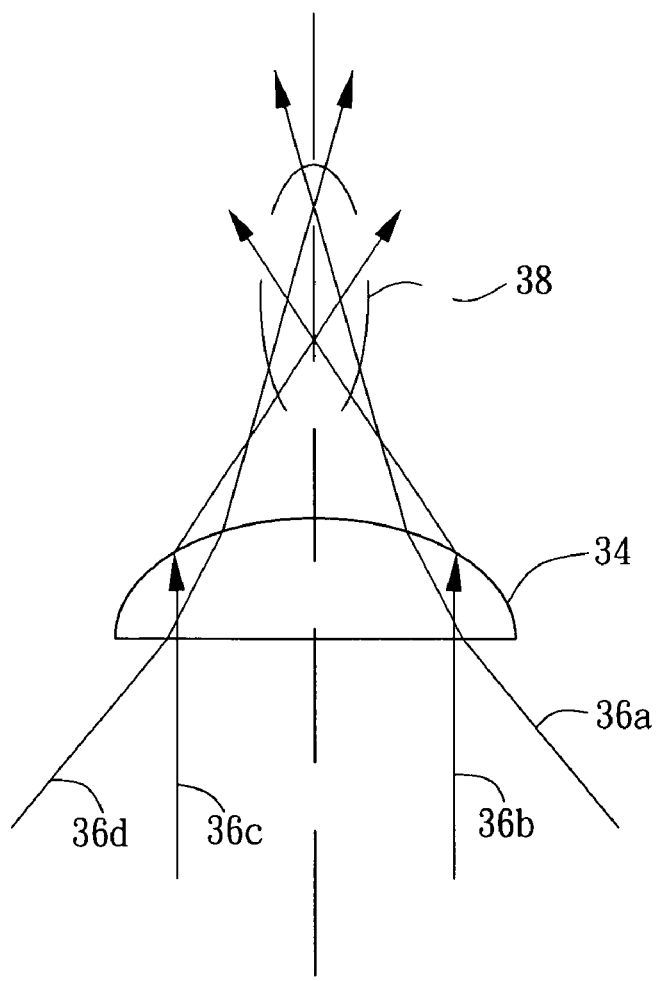
FIG. 3B is a schematic diagram depicting the optical characteristics of a semi-lenticular lens.

Please refer to FIG. 3B, which is a schematic diagram depicting the optical characteristics of a semi-lenticular lens. It is noted that a semi-lenticular lens 34 can be used to controllably diffuse light within a specific range. As seen in FIG. 3B, as four incident light 36a, 36b, 36c and 36d, each incident to the lens 34 by different angles, is traveling across an interface from the lens 34 to the external environment, all the exiting light corresponding respectively to the four incident light will converge in the convergence area 38 and then dissipate. Accordingly, the exiting angle of the light with large incident angle can be controlled to converge so as to enable all the incident light to be uniformly and controllably diffused.

Figure 4:
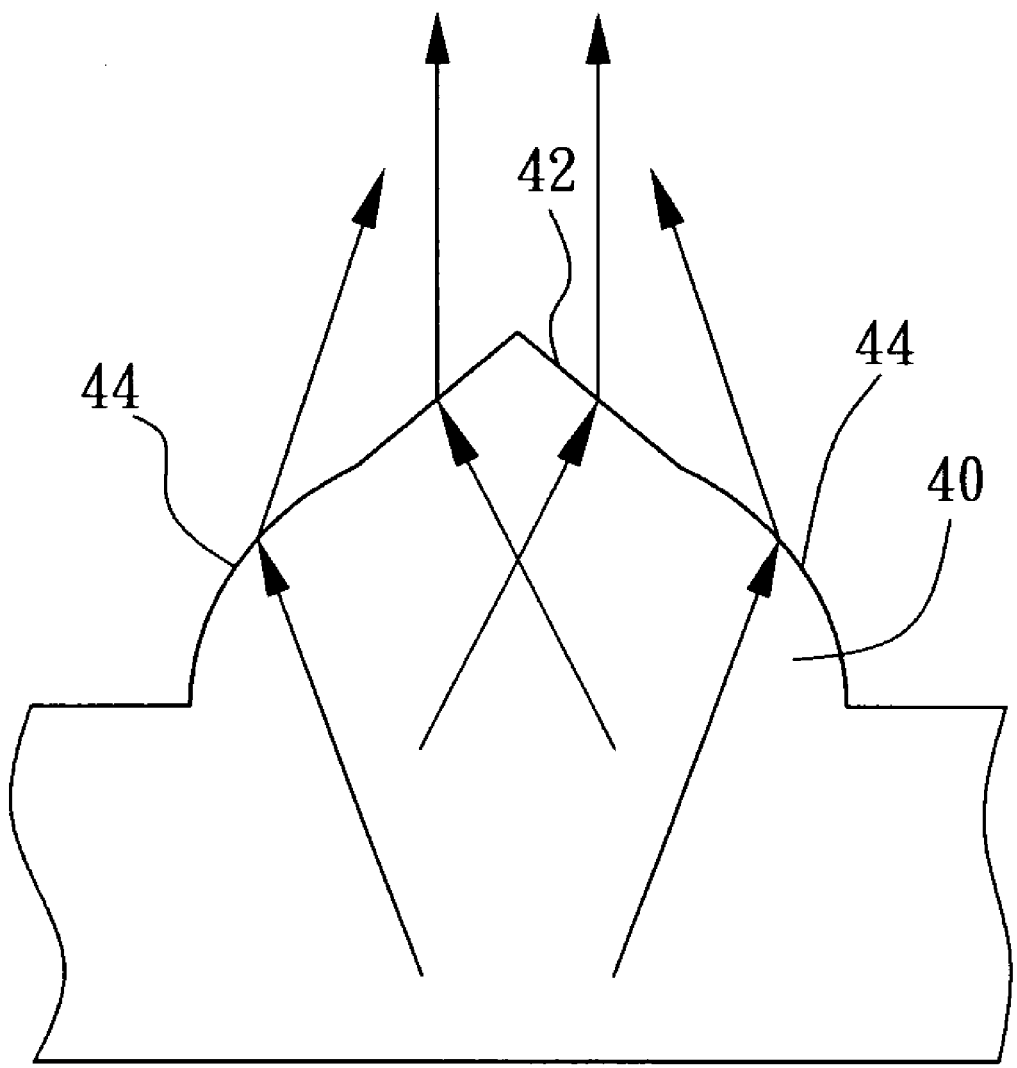
FIG. 4 is a cross-sectional view of a light modulation element composed of a semi-lenticular lens and a prism according to the present invention.

Please refer to FIG. 4, which is a cross-sectional view of a light modulation element composed of a semi-lenticular lens and a prism according to the present invention. As seen in FIG. 4, the light modulation element has good light scattering and collimating abilities since the optical characteristics of the prism 42 of the light modulation element 40 is similar to that of the prism shown in FIG. 3A, which is capable of scattering light, and the optical characteristics of the semi-lenticular lens 44 of the light modulation element 40 is similar to that of the semi-lenticular lens shown in FIG. 3B, which is capable of collimating light.

Figure 5A:
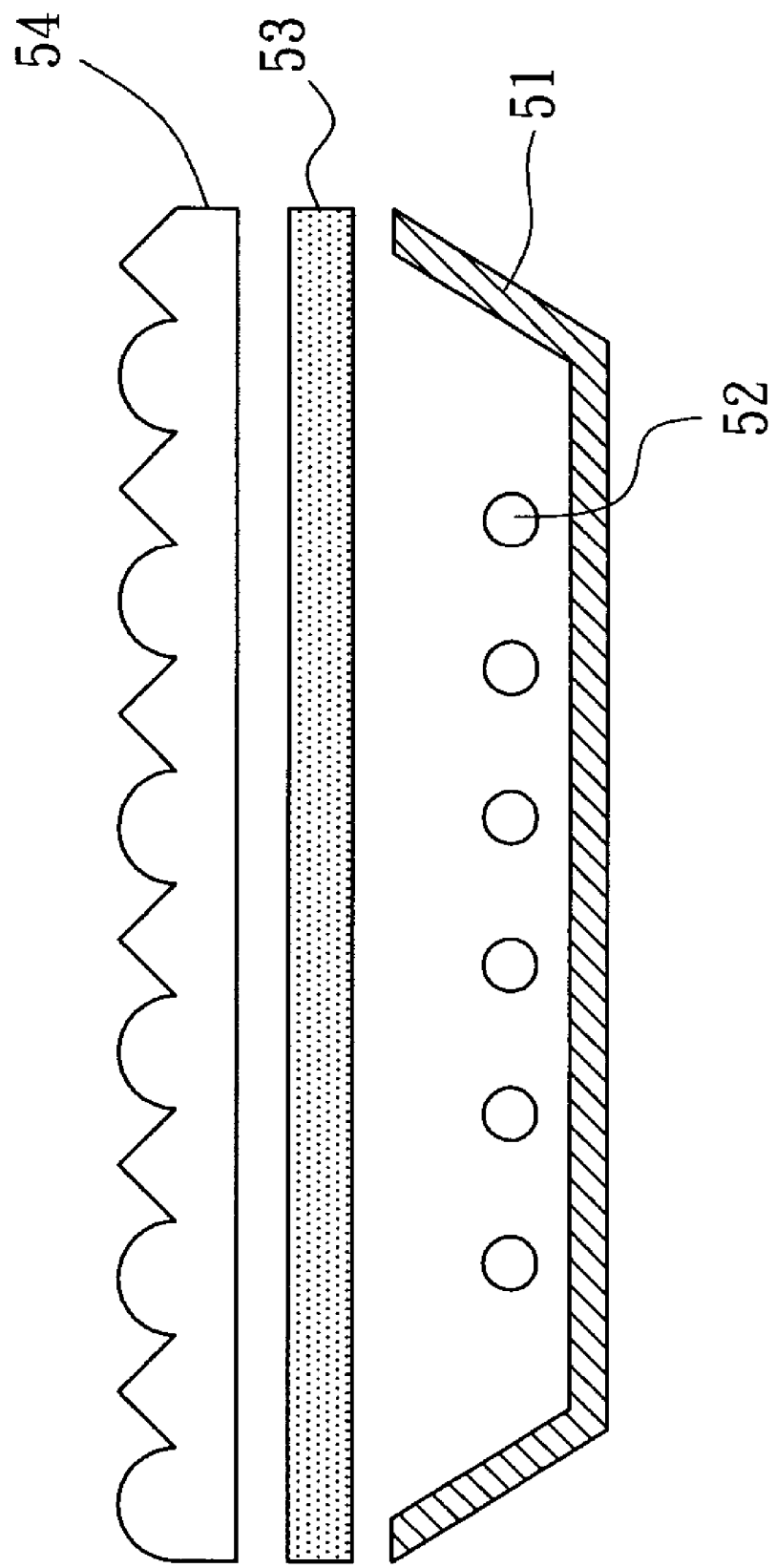
FIG. 5A is a cross-sectional view of a direct backlight module according to a first preferred embodiment of the present invention.
Figure 5B:
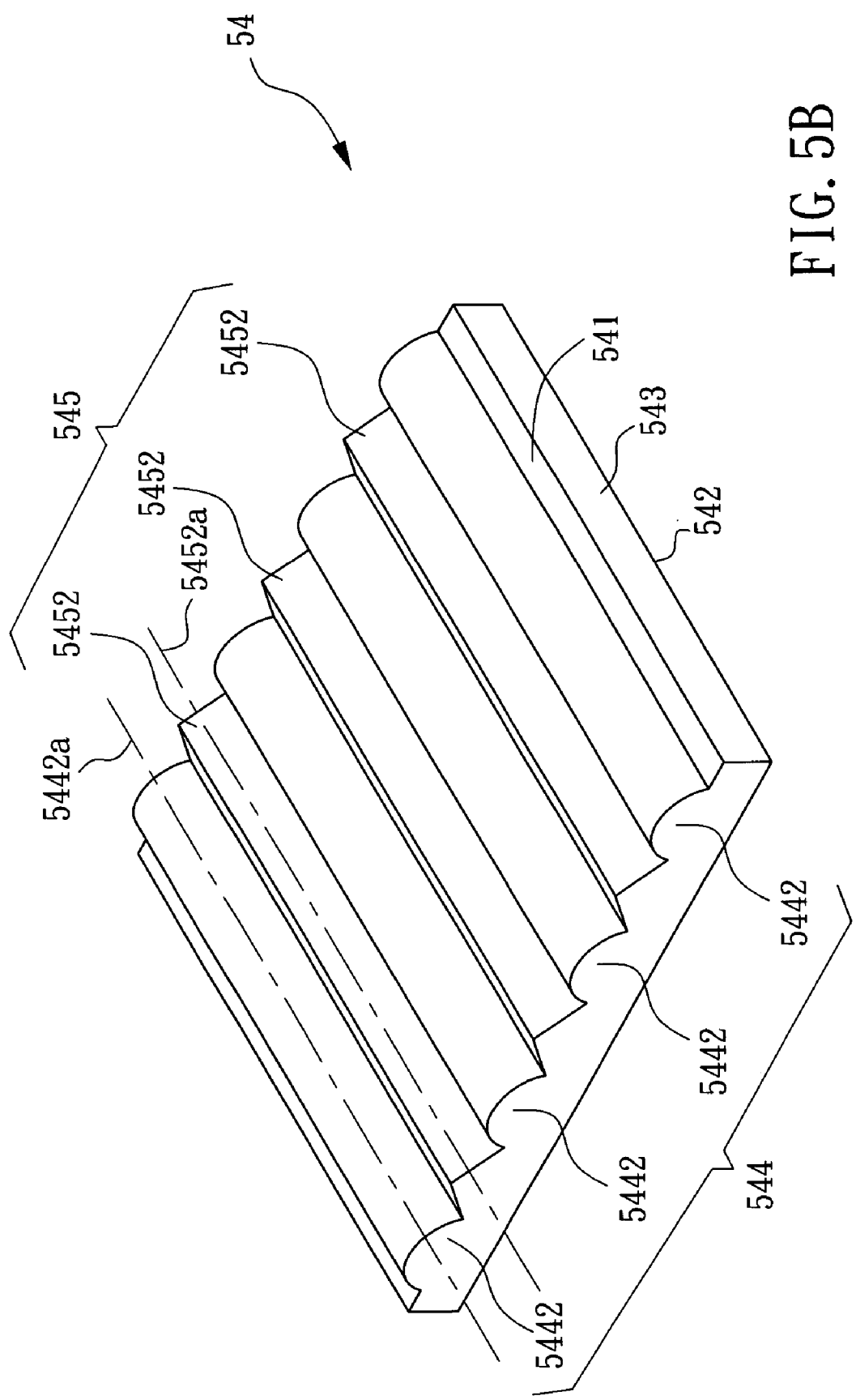
FIG. 5B is a schematic diagram showing an optical film being used in the first embodiment of the invention.

Please refer to FIG. 5A, which is a cross-sectional view of a direct backlight module according to a first preferred embodiment of the present invention. The direct backlight module of FIG. 5A comprises: a frame 51; a plurality of light sources 52, being arranged in the frame 51; a diffuser 53, being disposed over the frame 51; and an optical film 54, being disposed over the diffuser 53. As seen in FIG. 5B, the optical film 54 comprises a substrate 543 having a top surface 541 and a bottom surface 542; whereas a diffusion unit 544 comprising a plurality of semi-lenticular lens 5442 and a collimation unit 545 comprising a plurality of prisms 5454 are formed on the top surface 541 while using the diffusion unit 544 for scattering light incident to the bottom surface 542 and the collimation unit 545 for collimating light incident to the bottom surface 542.

Figure 5C:
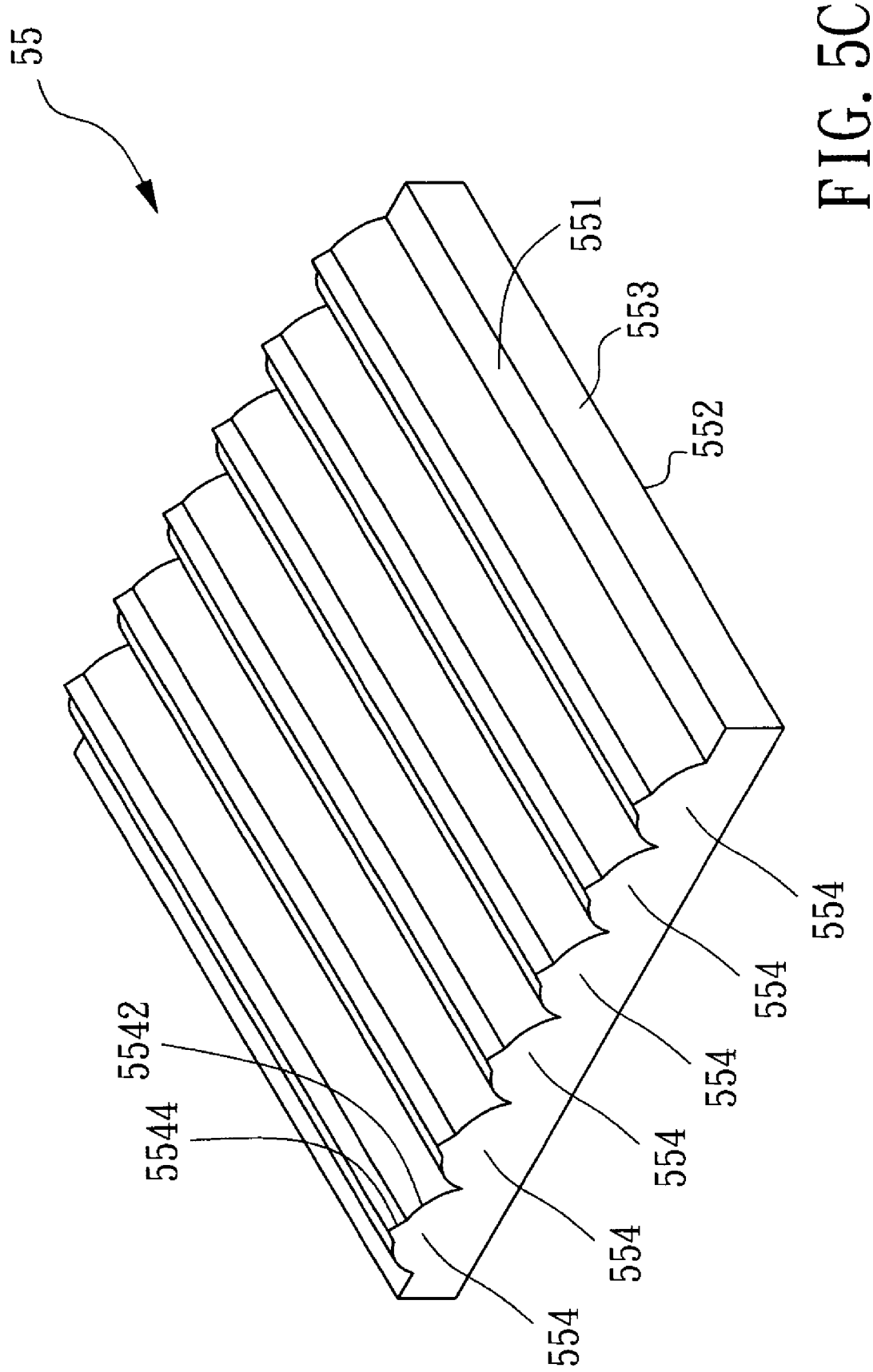
FIG. 5C is a schematic diagram showing another optical film being used in the first embodiment of the invention.

Please refer to FIG. 5C, which is a schematic diagram showing another optical film being used in the first embodiment of the invention. The optical film 55 of FIG. 5C comprises a substrate 553 having a top surface 551 and a bottom surface 552; whereas a plurality of light modulation elements 554 are formed on the top surface 551 while each light modulation element 554 is composed by superimposing a prism 5544 on top of a semi-lenticular lens 5542, by which the light incident to the bottom surface 552 is collimated by each prism 5544 and the light incident to the bottom surface 552 is scattered by each semi-lenticular lens 5542.

Figure 5D:
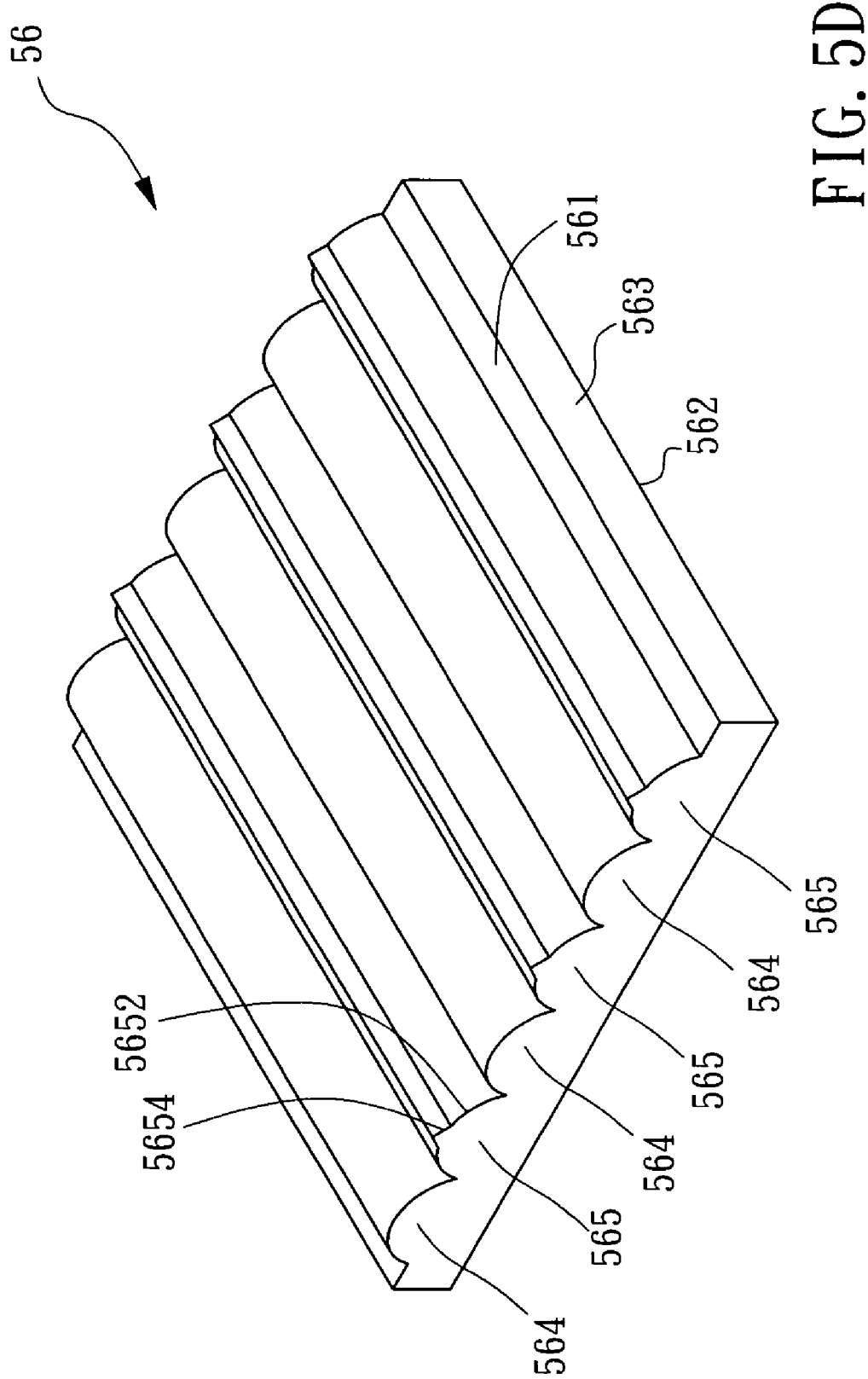
FIG. 5D is a schematic diagram showing yet another optical film being used in the first embodiment of the invention.

Please refer to FIG. 5D, which is a schematic diagram showing yet another optical film being used in the first embodiment of the invention. The optical film: 56 of FIG. 5D comprises a substrate 563 having a top surface 561 and a bottom surface 562; whereas a plurality of light modulation elements 565 and a plurality of first semi-lenticular lenses 564 are formed on the top surface 561 while each light modulation element 565 is composed by superimposing a prism 5654 on top of a second semi-lenticular lens

5652, by which the light incident to the bottom surface 562 is collimated by each prism 5654 and the light incident to the bottom surface 562 is scattered by each of the first and the second semi-lenticular lenses 5652.

Figure 5E:
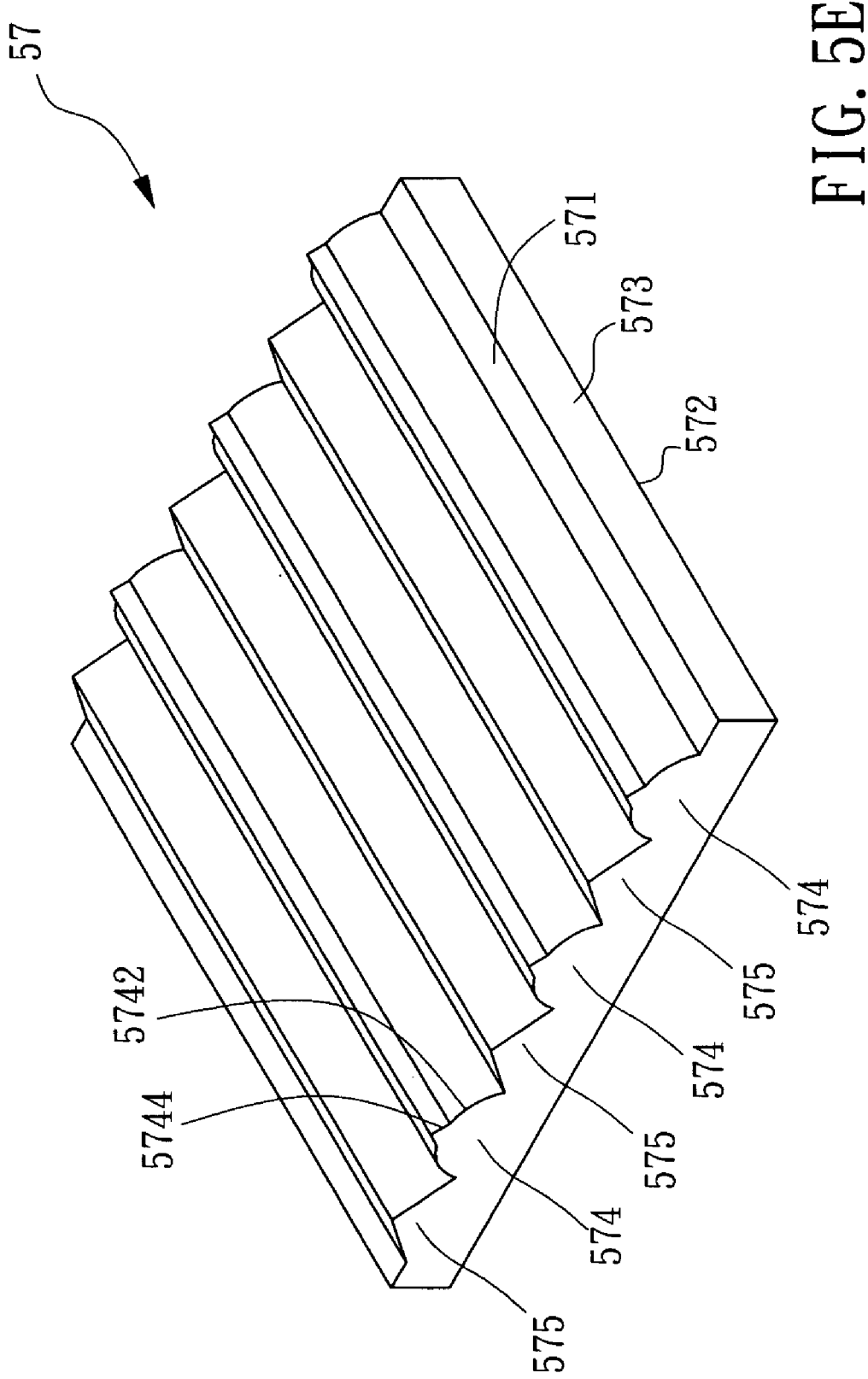
FIG. 5E is a schematic diagram showing further another optical film being used in the first embodiment of the invention.

Please refer to FIG. 5E, which is a schematic diagram showing further another optical film being used in the first embodiment of the invention. The optical film 57 of FIG. 5E comprises a substrate 573 having a top surface 571 and a bottom surface 572; whereas a plurality of light modulation elements 574 and a plurality of first prisms 575 are formed on the top surface 571 while each light modulation element 574 is composed by superimposing a second prism 5744 on top of a semi-lenticular lens 5742, by which the light incident to the bottom surface 572 is collimated by each of the first and the second prisms 5744 and the light incident to the bottom surface 572 is scattered by each semi-lenticular lenses 5742.

Figure 5F:
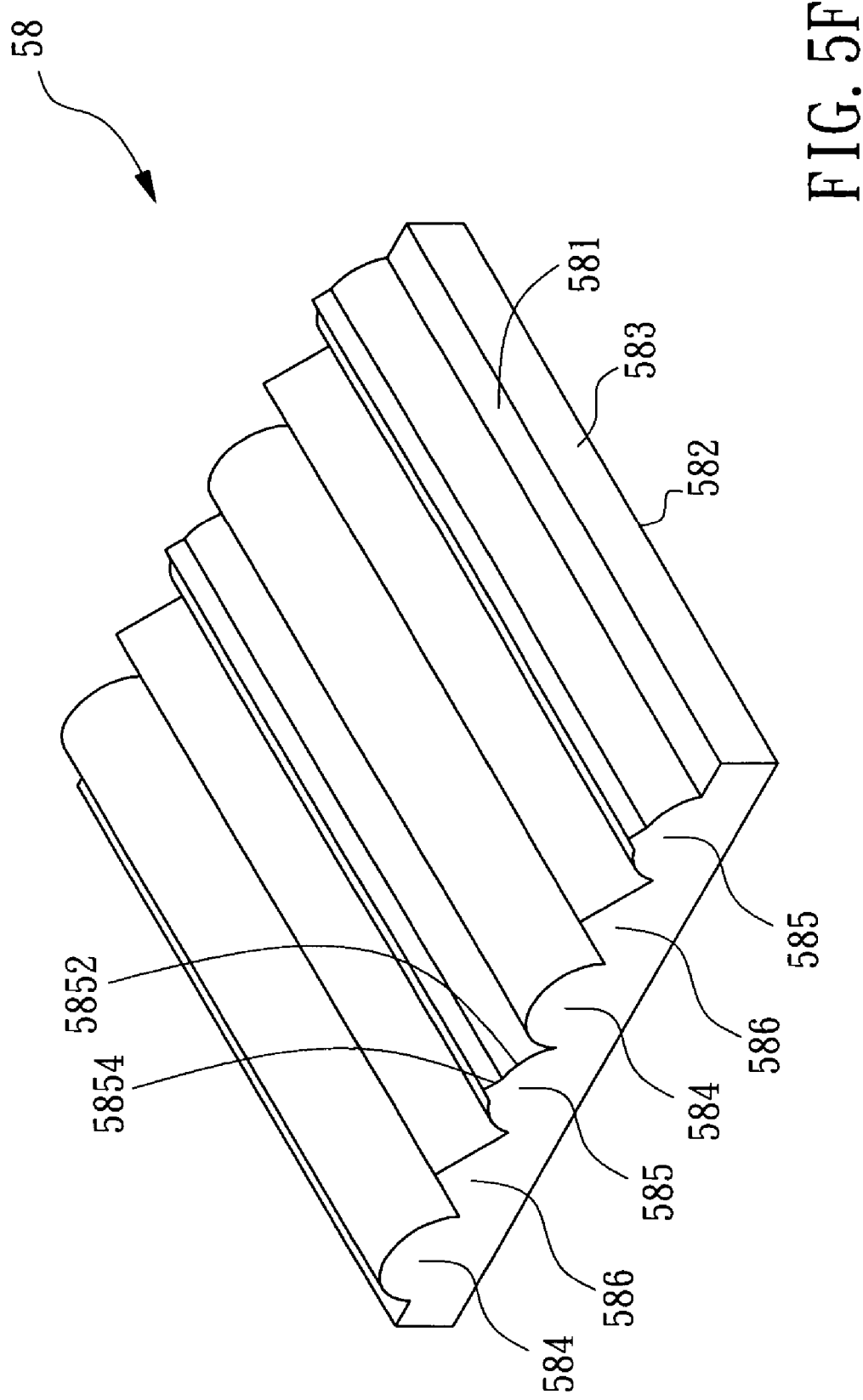
FIG. 5F is a schematic diagram showing further yet another optical film being used in the first embodiment of the invention.

Please refer to FIG. 5F, which is a schematic diagram showing further yet another optical film being used in the first embodiment of the invention. The optical film 58 of FIG. 5F comprises a substrate 583 having a top surface 581 and a bottom surface 582; whereas a plurality of light modulation elements 585, a plurality of first semi-lenticular lenses 584 and a plurality of first prisms 586 are formed on the top surface 581 while each light modulation element 585 is composed by superimposing a second prism 5854 on top of a second semi-lenticular lens 5852, by which the light incident to the bottom surface 582 is collimated by each of the first and the second prisms 586, 5854 and the light incident to the bottom surface 572 is scattered by each of the first and the second semi-lenticular lenses 584, 5852.

It is noted that all the semi-lenticular lenses shown in FIG. 5B to FIG. 5F respectively is characterized by a specific radius of curvature preferably in the range of 10 microns to 500 microns, and all prisms shown in FIG. 5B to FIG. 5F respectively is characterized by a vertex angle preferably in the range of 30° to 140° and a specific height. Moreover, it is noted that the specific radiuses of curvature of different semi-lenticular lenses can be different, and the vertex angles of different prism can be different, and the specific heights of different prisms can be different. In addition, the specific height of each prism can be varying along the axis of the same, e.g. the axis 5452*a* of FIG. 5B, and similarly the specific radius of curvature of each semi-lenticular lens can also be varying along the axis of the same, e.g. the axis 5442*a* of FIG. 5B, that is, the overall height of the cross-section of a prism, a semi-lenticular lens or a light modulation element is varying along the axis thereof.

Figure 5G:
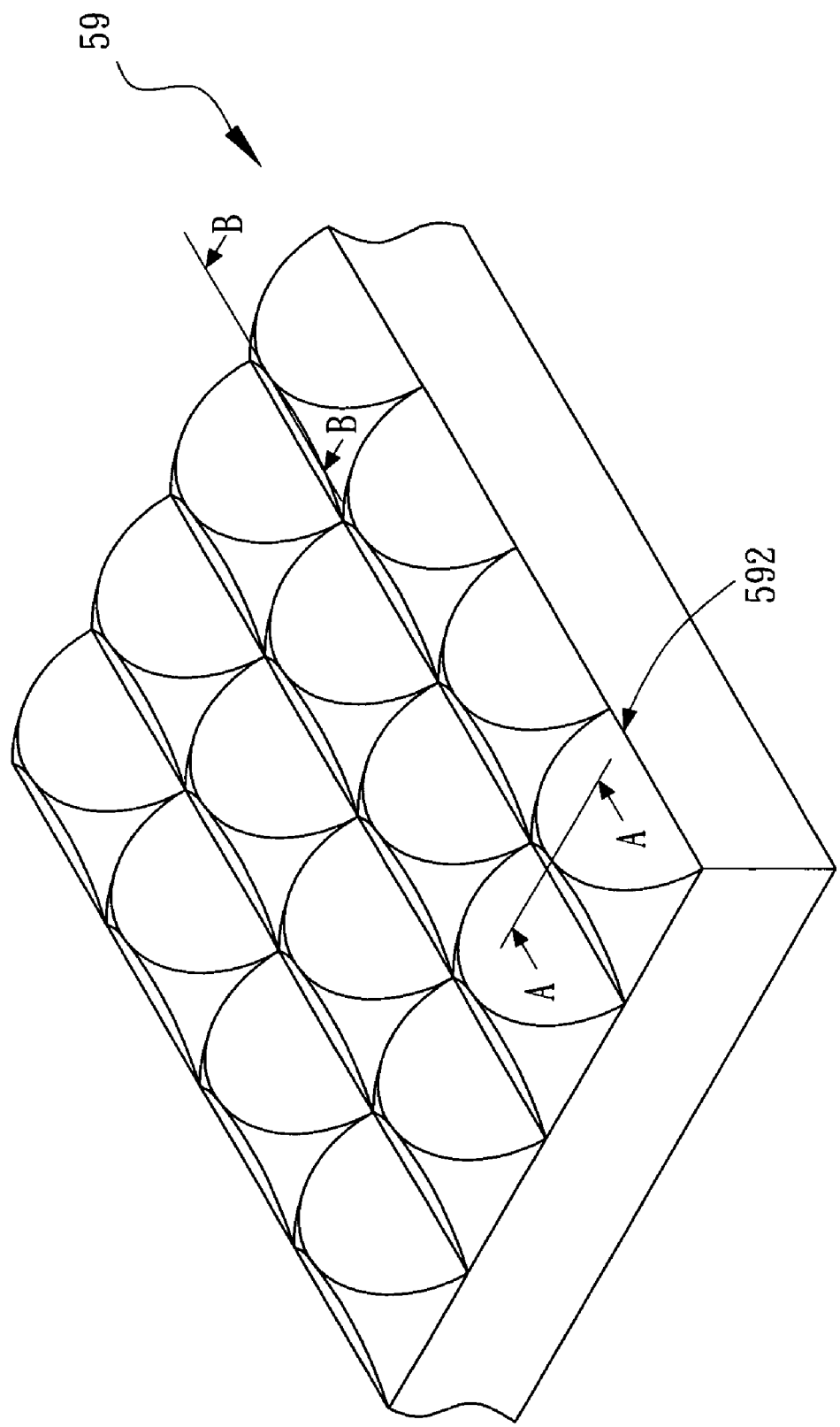
FIG. 5G is a 3D view of an optical film with array of microstructures according to a preferred embodiment of the present invention.
Figure 5I:
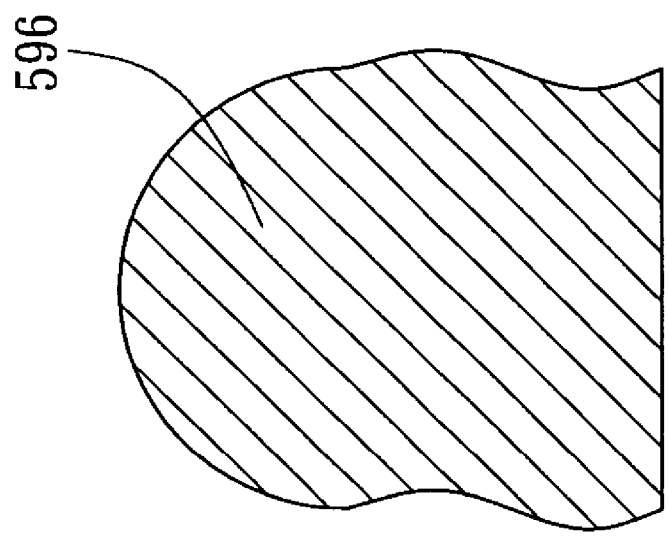
FIG. 5I is a B-B cross-sectional view of FIG. 5G.
Figure 5H:
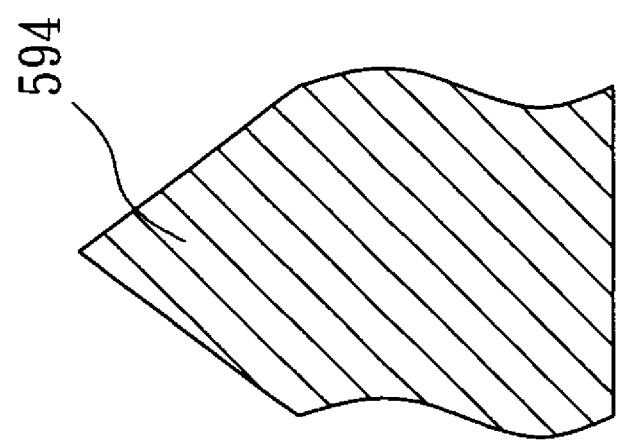
FIG. 5H is an A-A cross-sectional view of FIG. 5G.

Moreover, the aforesaid microstructures formed on the top surface of the optical film can be oriented parallel to each other or forming an included angle in the range of 0° to 90° therebetween. As seen in FIG. 5G, an optical film 59 is a film similar to the optical film 54 of FIG. 5B, but having the plural prisms 5452 being oriented perpendicular to the plural semi-lenticular lenses 5442 such that the optical film 59 is a film having a plurality of microstructures 592 with diffusion and collimation abilities formed thereon. Since the A-A cross-section of a microstructure 592 shown in FIG. 5H is an edge 594 formed by two meeting surfaces, which is similar to the cross-section of a prism, it is capable of collimating light. In addition, since the B-B cross-section of a microstructure 592 shown in FIG. 5I is an arc 596, which is similar to the cross-section of a semi-lenticular lens, it is capable of scattering light. In another preferred embodiment of the invention, each semi-lenticular lens can disposed parallel to a first direction while the axis thereof being defined by a first function of straight line or curve line, each prism can be disposed parallel to a second direction while the axis thereof being defined by a second function of straight line or curve line, whereas the included angle formed between the first direction and the second direction is in the range of 0° to 90°.

Figure 6:
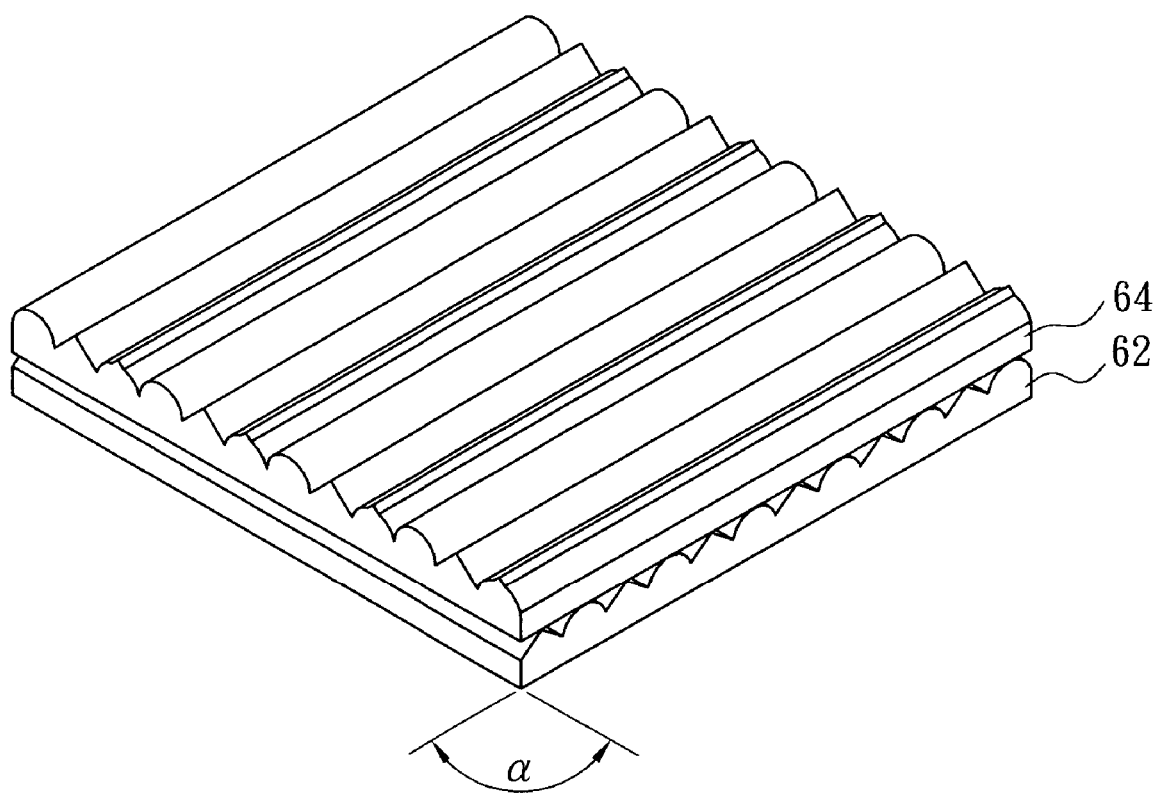
FIG. 6 is a schematic view of stacked optical films according to the present invention.

Please refer to FIG. 6, which is a schematic view of stacked optical films according to the present invention. The direct backlight module of the invention can comprise two optical films 62, 64, whereas the orientation of one of the two optical films is rotated by an angle a ranged between 0° and 90° to be placed overlapping another optical film. In addition, the two optical films 62, 64, each can be any optical film selected from those shown in FIG. 5B to FIG. 5G.

For the prisms formed on the optical film of the invention, it is not necessary for them to have the same vertex angle, the same height or the same bottom area contacting to the substrate. For the semi-lenticular lenses formed on the optical film of the invention, it is also not necessary for them to have the same radius of curvature, the same vertical depth or the same bottom area contacting to the substrate. Similarly, for the light modulation elements formed on the optical film of the invention, it is also not necessary for them to have the same radius of curvature of every semi-lenticular lens, the same vertex angle of every prism, the same height or the same bottom area contacting to the substrate.

Figure 7A:
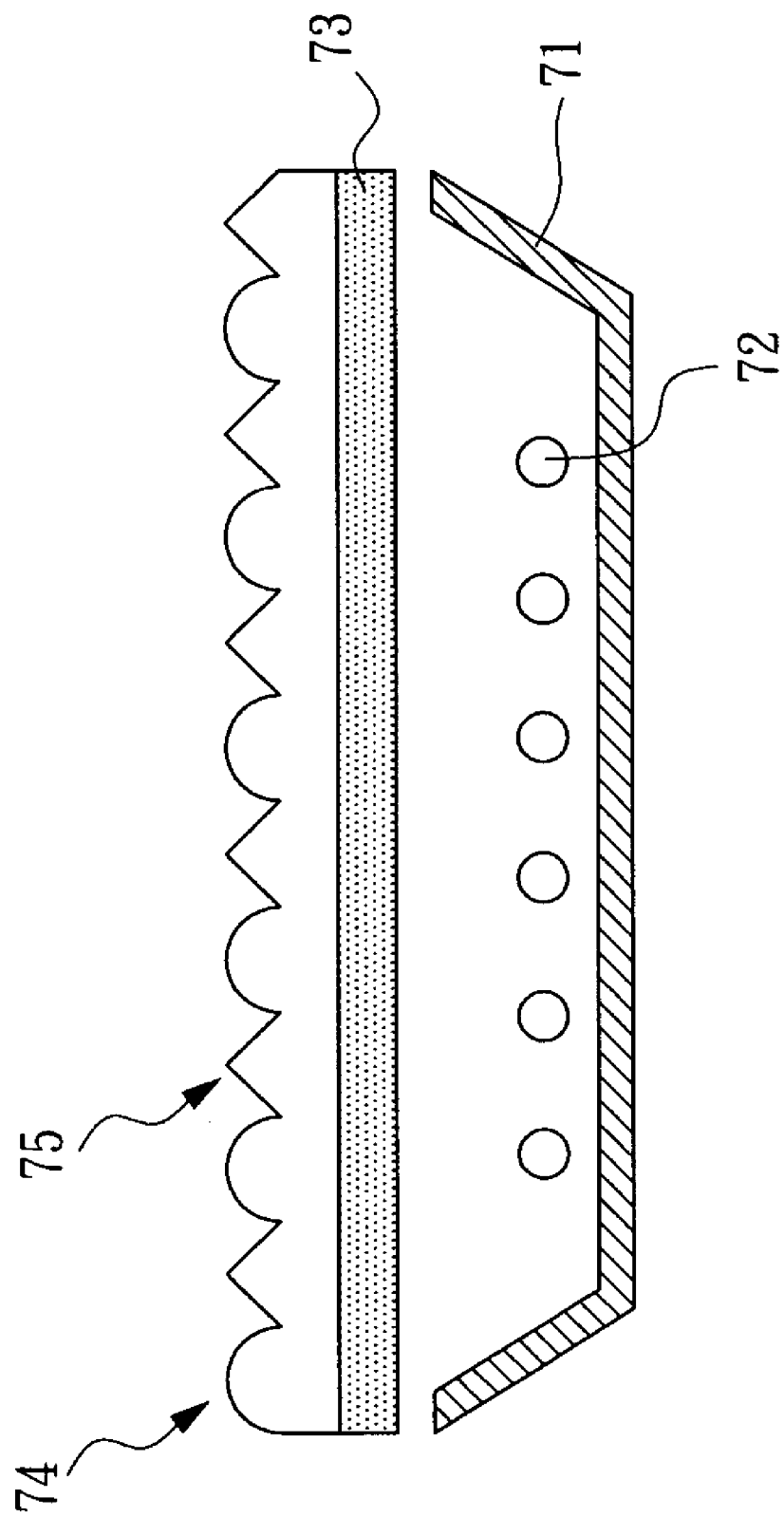
FIG. 7A is a cross-sectional view of a direct backlight module according to a second preferred embodiment of the present invention.

Please refer FIG. 7A, which is a cross-sectional view of a direct backlight module according to a second preferred embodiment of the present invention. The direct backlight module of FIG. 7A comprises: a frame 71; at least a light source 72, being arranged in the frame 71; and a diffuser 73 having a top surface and a bottom surface, being disposed over the frame 71 and doped with micro particles for light scattering; wherein a diffusion unit 74 and a collimation unit 75 are formed on the top surface of the diffuser 73 while using the diffusion unit 74 for scattering light incident to the bottom surface and the collimation unit 75 for collimating light incident to the bottom surface, and preferably, the thickness of the diffuser is in the range between 1 mm to 3 mm.

Figure 7B:
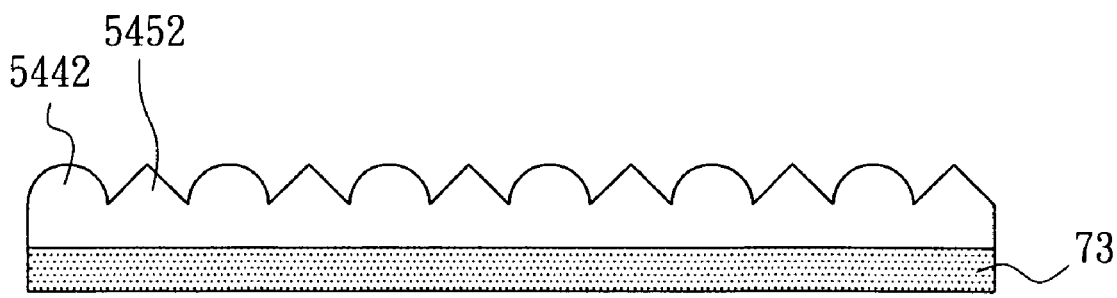
FIG. 7B is a cross-sectional diagram showing a diffuser being used in the second embodiment of the invention.

Please refer to FIG. 7B, which is a cross-sectional diagram showing a diffuser being used in the second embodiment of the invention. As seen in FIG. 7B, the plural semi-lenticular lenses 5442 and the plural prisms shown in FIG. 5B are formed on the diffuser 73 instead of the substrate.

Figure 7C:
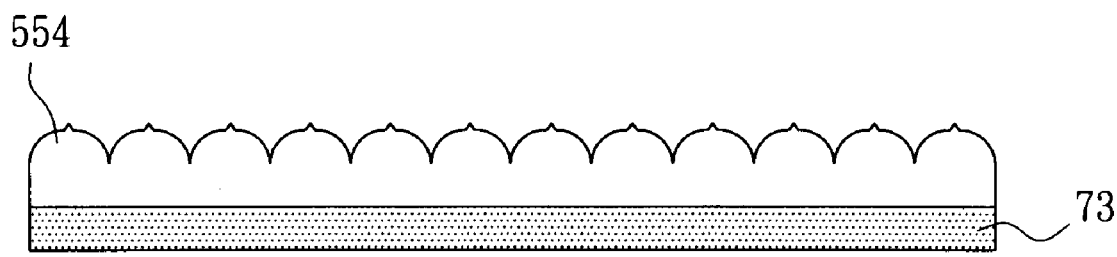
FIG. 7C is a cross-sectional diagram showing another diffuser being used in the second embodiment of the invention.

Please refer to FIG. 7C, which is a cross-sectional diagram showing another diffuser being used in the second embodiment of the invention. As seen in FIG. 7C, the plural light modulation elements 554 shown in FIG. 5C are formed on the diffuser 73 instead of the substrate.

Figure 7D:
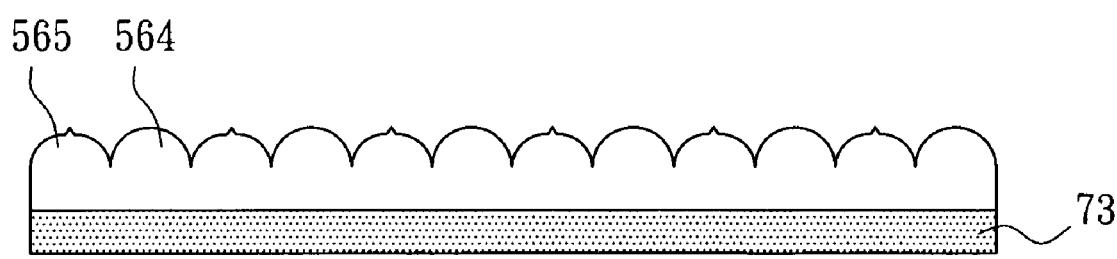
FIG. 7D is a cross-sectional diagram showing yet another diffuser being used in the second embodiment of the invention.

Please refer to FIG. 7D, which is a cross-sectional diagram showing yet another diffuser being used in the second embodiment of the invention. As seen in FIG. 7D, the plural light modulation elements 565 and the plural first semi-lenticular lenses 564 shown in FIG. 5D are formed on the diffuser 73 instead of the substrate.

Figure 7E:
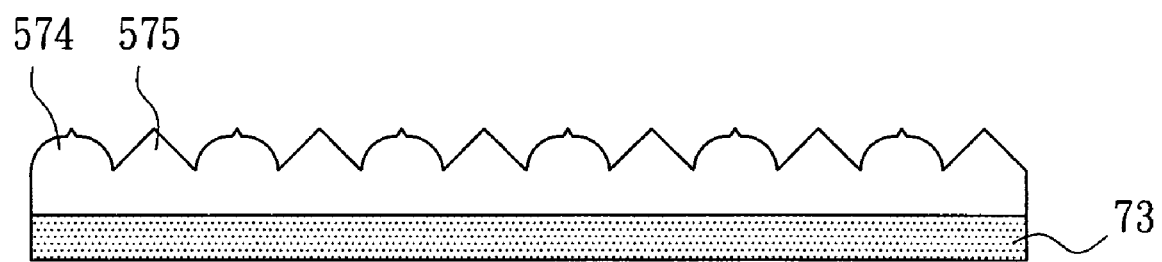
FIG. 7E is a cross-sectional diagram showing further another diffuser being used in the second embodiment of the invention.

Please refer to FIG. 7E, which is a cross-sectional diagram showing further another diffuser being used in the second embodiment of the invention. As seen in FIG. 7E, the plural light modulation elements 574 and the plural first prisms 575 shown in FIG. 5E are formed on the diffuser 73 instead of the substrate.

Figure 7F:
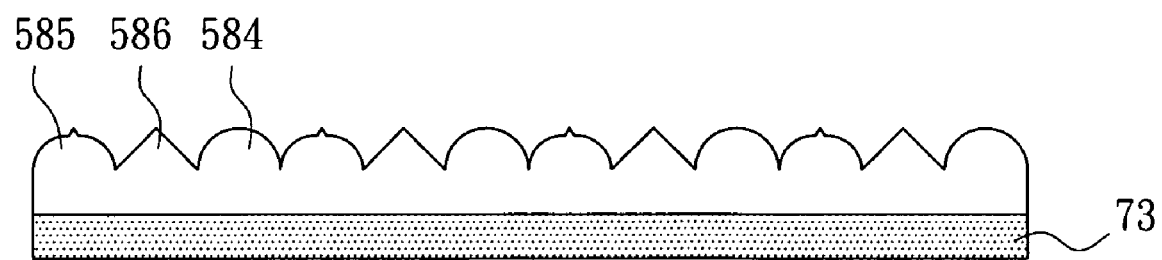
FIG. 7F is a cross-sectional diagram showing further yet another diffuser being used in the second embodiment of the invention.

Please refer to FIG. 7F, which is a cross-sectional diagram showing further yet another diffuser being used in the second embodiment of the invention. As seen in FIG. 7F, the plural light modulation elements 585, the plural first semi-lenticular lenses 584 and the plural prisms 586 shown in FIG. 5F are formed on the diffuser 73 instead of the substrate.

Similarly, it is noted that all the semi-lenticular lenses shown in FIG. 7B to FIG. 7F respectively is characterized by a specific radius of curvature preferably in the range of 10 microns to 500 microns, and all prisms shown in FIG. 5B to FIG. 5F respectively is characterized by a vertex angle preferably in the range of 30° to 140° and a specific height. It is noted that the specific radiuses of curvature of different semi-lenticular lenses can be different, and the vertex angles of different prism can be different, and the specific heights of different prisms can be different. In addition, the specific height of each prism can be varying along the axis of the same, e.g. the axis 5452a of FIG. 5B, and similarly the specific radius of curvature of each semi-lenticular lens can also be varying along the axis of the same, e.g. the axis 5442a of FIG. 5B, that is, the overall height of the cross-section of a prism, a semi-lenticular lens or a light modulation element is varying along the axis thereof.

Figure 7G:
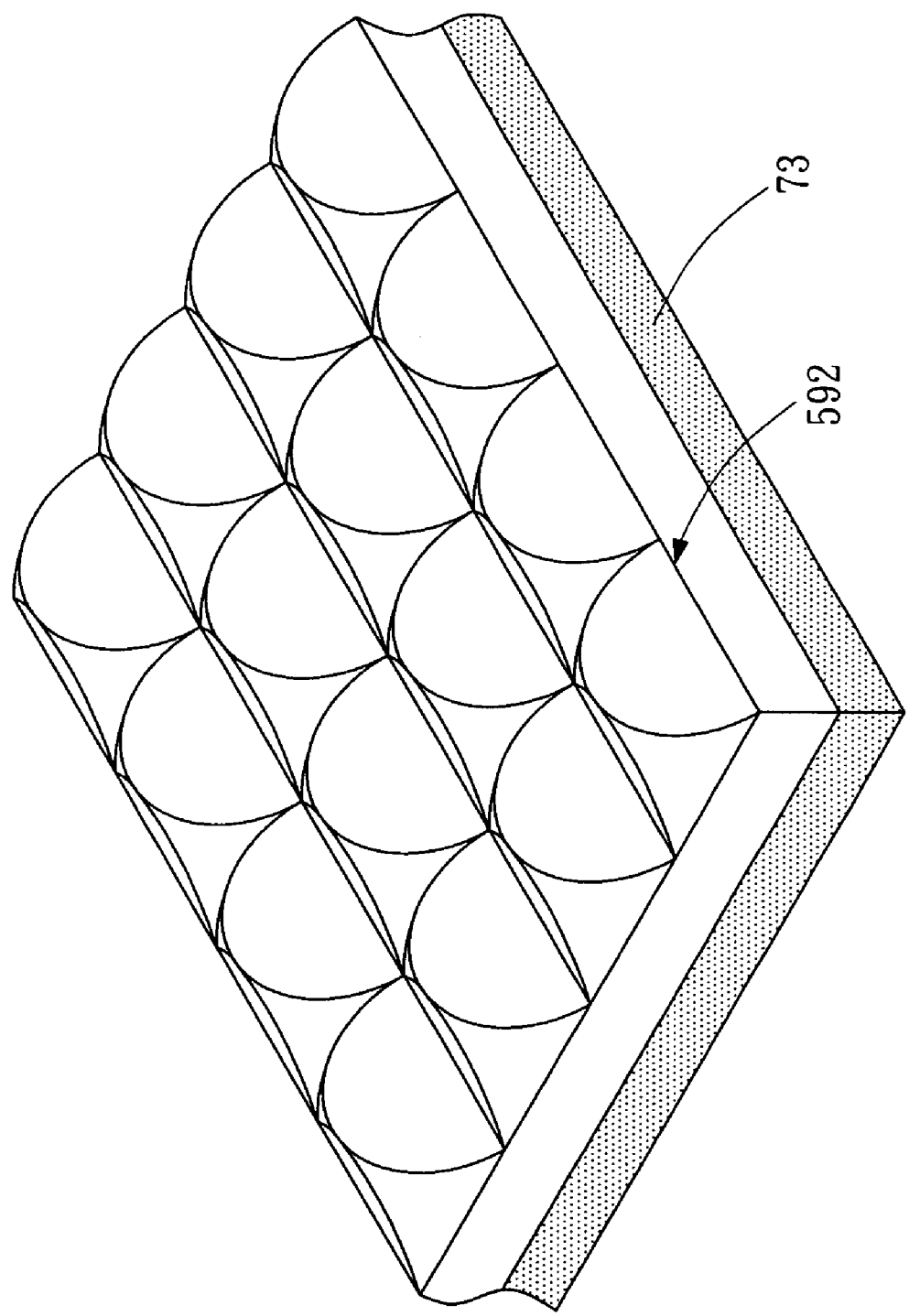
FIG. 7G is a 3D view of a diffuser with array of microstructures according to the second preferred embodiment of the present invention.

Moreover, the aforesaid microstructures formed on the top surface of the diffuser 73 can be oriented parallel to each other or forming an included angle in the range of 0° to 90° therebetween. The microstructures 592 with diffusion and collimation abilities of FIG. 5G also can be formed on the diffuser 73 as seen in FIG. 7G. Similarly, in another preferred embodiment of the invention, each semi-lenticular lens can disposed parallel to a first direction while the axis thereof being defined by a first function of straight line or curve line, each prism can be disposed parallel to a second direction while the axis thereof being defined by a second function of straight line or curve line, whereas the included angle formed between the first direction and the second direction is in the range of 0° to 90°.

To sum up, the direct backlight module of the present invention can either adopt an optical film with microstructures of diffusion and collimation abilities or use a diffuser integrated with microstructure of diffusion and collimation abilities, such that it is capable of obtaining the required concentration of luminance and variation of luminance with viewing angles, and enabling the backlight module to have a comparatively simple structure so as to reduce the manufacturing cost thereof.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A direct backlight module, comprising:
   a frame;
   at least a light source, being arranged in the frame;
   a diffuser, being disposed over the frame; and
   at least an optical film, being disposed over both the diffuser and the at least a light source, further comprising a substrate having a top surface and a bottom surface;
   wherein a diffusion unit and a collimation unit are formed on the top surface while using the diffusion unit for diffusing light incident to the bottom surface and the collimation unit for collimating light incident to the bottom surface,
   wherein the diffusion unit further comprises at least a semi-lenticular lens, and the collimation unit further comprises at least a prism,
   wherein each semi-lenticular lens is characterized by a specific radius of curvature preferably in the range of 10 microns to 500 microns, and each prism is characterized by a vertex angle preferably in the range of 30° to 140° and a specific height, and
   wherein the specific height of each prism is varying along the axis of the same, and the specific radius of curvature of each semi-lenticular lens is varying along the axis of the same.

2. The direct backlight module of claim 1, wherein each semi-lenticular lens is disposed parallel to a first direction and each prism is disposed parallel to a second direction, while the included angle formed between the first direction and the second direction is in the range of 0° to 90°.

3. The direct backlight module of claim 2, wherein the axis of each semi-lenticular lens is defined by a first function and the axis of each prism is defined by a second function.

4. The direct backlight module of claim 3, wherein the first function is a function selected from the group consisting of a function of straight line and a non-liner function of curve line while the second a function selected from the group consisting of a linear function of straight line and a non-liner function of curve line.

5. The direct backlight module of claim 1, wherein the specific radiuses of curvature of different semi-lenticular lenses are not the same, and the vertex angles of different prisms are not the same, and the specific heights of different prisms are not the same.

6. The direct backlight module of claim 1, wherein at least a light modulation element is formed on the top surface of the substrate of the optical film while each light modulation element is composed by superimposing a prism on top of a semi-lenticular lens.

7. The direct backlight module of claim 1, wherein at least a light modulation element and at least a first semi-lenticular lens are formed on the top surface of the substrate of the optical film while each light modulation element is composed by superimposing a prism on top of a second semi-lenticular lens.

8. The direct backlight module of claim 7, wherein the specific radiuses of curvature of different first and second semi-lenticular lenses are not the same, and the vertex angles of different prisms are not the same, and the specific heights of different prisms are not the same.

9. The direct backlight module of claim 1, wherein at least a light modulation element and at least a first prism are formed on the top surface of the substrate of the optical film while each light modulation element is composed by superimposing a second prism on top of a semi-lenticular lens.

10. The direct backlight module of claim 9, wherein the specific radiuses of curvature of different semi-lenticular lenses are not the same, and the vertex angles of different first and second prisms are not the same, and the specific heights of different first and second prisms are not the same.

11. The direct backlight module of claim 1, wherein at least a light modulation element, at least a first semi-lenticular lens and at least a first prism are formed on the top surface of the substrate of the optical film while each light modulation element is composed by superimposing a second prism on top of a second semi-lenticular lens.

12. The direct backlight module of claim 11, wherein the specific radiuses of curvature of different first and second semi-lenticular lenses are not the same, and the vertex angles of different first and second prisms are not the same, and the specific heights of different first and second prisms are not the same.

13. The direct backlight module of claim 1, wherein a plurality of microstructures with light collimation and diffusion capabilities are formed on the top surface of the substrate of the optical film.

14. The direct backlight module of claim 1, comprising two optical films, wherein the orientation of one of the two optical films is rotated by an angle ranged between 0° and 90° to be placed overlapping another optical film.

15. A direct backlight module, comprising:
a frame;
at least a light source, being arranged in the frame; and
a diffuser having a top surface and a bottom surface, the diffuser being disposed over both the frame and the at least a light source, the diffuser being doped with micro particles for light scattering;
wherein a diffusion unit and a collimation unit are formed on the top surface of the diffuser while using the diffusion unit for scattering light incident to the bottom surface and the collimation unit for collimating light incident to the bottom surface,
wherein the diffusion unit further comprises at least a semi-lenticular lens, and the collimation unit further comprises at least a prism,
wherein each semi-lenticular lens is characterized by a specific radius of curvature preferably in the range of 10 microns to 500 microns, and each prism is characterized by a vertex angle preferably in the range of 30° to 104° and a specific height, and
wherein the specific height of each prism is varying along the axis of the same, and the specific radius of curvature of each semi-lenticular lens is varying along the axis of the same.

16. The direct backlight module of claim 15, wherein the thickness of the diffuser is in the range between 1 mm to 3 mm.

17. The direct backlight module of claim 15, wherein each semi-lenticular lens is disposed parallel to a first direction and each prism is disposed parallel to a second direction, while the included angle formed between the first direction and the second direction is in the range of 0° to 90°.

18. The direct backlight module of claim 17, wherein the axis of each semi-lenticular lens is defined by a first function and the axis of each prism is defined by a second function.

19. The direct backlight module of claim 18, wherein the first function is a function selected from the group consisting of a function of straight line and a non-liner function of curve line while the second a function selected from the group consisting of a linear function of straight line and a non-liner function of curve line.

20. The direct backlight module of claim 1, wherein the specific radiuses of curvature of different semi-lenticular lenses are not the same, and the vertex angles of different prisms are not the same, and the specific heights of different prisms are not the same.

21. The direct backlight module of claim 15, wherein at least a light modulation element is formed on the top surface of the substrate of the optical film while each light modulation element is composed by superimposing a prism on top of a semi-lenticular lens.

22. The direct backlight module of claim 15, wherein at least a light modulation element and at least a first semi-lenticular lens are formed on the top surface of the diffuser while each light modulation element is composed by superimposing a prism on top of a second semi-lenticular lens.

23. The direct backlight module of claim 22, wherein the specific radiuses of curvature of different first and second semi-lenticular lenses are not the same, and the vertex angles of different prism are not the same, and the specific heights of different prisms are not the same.

24. The direct backlight module of claim 15, wherein at least a light modulation element and at least a first prism are formed on the top surface of the diffuser while each light modulation element is composed by superimposing a second prism on top of a semi-lenticular lens.

25. The direct backlight module of claim 24, wherein the specific radiuses of curvature of different semi-lenticular lenses are not the same, and the vertex angles of different first and second prism are not the same, and the specific heights of different first and second prisms are not the same.

26. The direct backlight module of claim 15, wherein at least a light modulation element, at least a first semi-lenticular lens and at least a first prism are formed on the top surface of the diffuser while each light modulation element is composed by superimposing a second prism on top of a second semi-lenticular lens.

27. The direct backlight module of claim 26, wherein the specific radiuses of curvature of different first and second semi-lenticular lenses are not the same, and the vertex angles of different first and second prism are not the same, and the specific heights of different first and second prisms are not the same.

28. The direct backlight module of claim 15, wherein a plurality of microstructures with light collimation and diffusion capabilities are formed on the top surface of the diffuser.

* * * * *